US009754283B2

(12) United States Patent
Guo et al.

(10) Patent No.: US 9,754,283 B2
(45) Date of Patent: Sep. 5, 2017

(54) RECOMMENDING A BUDGET FOR AN ADVERTISEMENT PRESENTED ON AN ONLINE SYSTEM

(71) Applicant: Facebook, Inc., Menlo Park, CA (US)

(72) Inventors: Dong Guo, Milpitas, CA (US); Mark Kar Hong Wong, Redwood City, CA (US); Zhi Zhong, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 218 days.

(21) Appl. No.: 14/169,513

(22) Filed: Jan. 31, 2014

(65) Prior Publication Data
US 2015/0220976 A1    Aug. 6, 2015

(51) Int. Cl.
*G06Q 30/02* (2012.01)

(52) U.S. Cl.
CPC ..... *G06Q 30/0249* (2013.01); *G06Q 30/0273* (2013.01)

(58) Field of Classification Search
CPC ................................ G06Q 30/0241–30/0277
USPC ...................................................... 705/14.48
See application file for complete search history.

(56) References Cited

U.S. PATENT DOCUMENTS

| 2007/0073583 | A1* | 3/2007 | Grouf | G06Q 30/00 |
| | | | | 705/14.48 |
| 2012/0166532 | A1 | 6/2012 | Juan et al. | |
| 2014/0156360 | A1 | 6/2014 | Shalita et al. | |
| 2014/0156566 | A1 | 6/2014 | Kabiljo et al. | |
| 2014/0156744 | A1 | 6/2014 | Hua et al. | |

OTHER PUBLICATIONS

Daniel G Goldstein, et al., Nudge Your Customers Toward Better Choices, Harvard Business Review, Dec. 2008 Issue.*

* cited by examiner

*Primary Examiner* — David Stoltenberg
*Assistant Examiner* — Robert C Johnson
(74) *Attorney, Agent, or Firm* — Fenwick & West LLP

(57) ABSTRACT

An online system provides identifies multiple candidate budgets to an advertiser requesting presentation of advertisements via the online system. The advertiser may select a candidate budget used for presenting advertisements via the online system. A default budget may be identified from the candidate budgets to increase the likelihood of the advertiser selecting the default budget. The candidate budgets and the default budget are determined by the online system to maximize the likelihood that an advertiser elects to present advertisements via the online system or to maximize revenue received the online system for presenting advertisements from the advertiser. Various factors are specific to the advertiser, the object being advertised, and other contextual information may be used to determine the candidate budgets.

22 Claims, 3 Drawing Sheets

Daily Budget: Select one...

| | |
|---|---|
| $5.00 per day | Estimated 1-5 likes/day |
| ☑ *$10.00 per day* | *Estimated 6-10 likes/day* |
| $15.00 per day | Estimated 11-15 likes/day |
| $20.00 per day | Estimated 16-20 likes/day |
| $25.00 per day | Estimated 21-25 likes/day |

Additional Options

FIG. 4A

Lifetime Budget: Select one...

| | |
|---|---|
| $150.00 for 30 days | Estimated 1-5 likes/day |
| ☑ *$300.00 for 30 days* | *Estimated 6-10 likes/day* |
| $450.00 for 30 days | Estimated 11-15 likes/day |
| $600.00 for 30 days | Estimated 16-20 likes/day |
| $750.00 for 30 days | Estimated 21-25 likes/day |

Additional Options

FIG. 4B

RECOMMENDING A BUDGET FOR AN ADVERTISEMENT PRESENTED ON AN ONLINE SYSTEM

BACKGROUND

This disclosure relates generally to online systems, and in particular to pricing advertisements presented by an online system.

An online system allows its users to connect to and communicate with other online system users. Users may create profiles on an online system that are tied to their identities and include information about the users, such as interests and demographic information. The users may be individuals or entities such as corporations or charities. Because of the increasing popularity of online systems and the increasing amount of user-specific information maintained by online systems, such as social networking systems, an online system provides an ideal forum for advertisers to increase awareness about products or services by presenting advertisements to online system users.

Presenting advertisements to users of an online system allows an advertiser to gain public attention for products or services and to persuade online system users to take an action regarding the advertiser's products, services, opinions, or causes. Many online systems generate revenue by displaying advertisements to their users. Frequently, online systems charge advertisers for each presentation of an advertisement to an online system user (i.e., each "impression" of the advertisement) or for interaction with an advertisement by an online system user.

Advertisers may specify a budget for an advertisement or advertising campaign to an online system representing a total amount of money the advertiser has allocated to spend for presenting one or more advertisements via the online system. For example, an advertiser specifies a "daily budget" for an advertisement or an advertising campaign identifying an amount the advertiser has allocated for spending each day to present the advertisement or to present advertisements from the advertising campaign via the online system. When selecting advertisements to presentation to online system users, the online system modifies a bid amount of an advertisement associated with a daily budget on behalf of the advertiser until the advertiser notifies the online system to cease presentation of the advertisement.

Alternatively, an advertiser communicates a "lifetime budget" to the online system representing an amount of money the advertiser has allocated to spend on an advertising campaign over a specific time interval. When a lifetime budget is specified, the online system adjusts a bid amount associated with one or more advertisements in the advertising campaign on behalf of the advertiser based on the lifetime budget when selecting advertisements for presentation to online system users until the specified time period lapses. Hence, when an advertiser specifies a budget for an advertisement or an advertising campaign, the online system modifies a bid amount associated with the advertisement or with advertisements in the advertising campaign so the specified budget is completely used but the amount provided to the online system by the advertiser is limited to the specified budget.

However, when providing one or more advertisements to the online system, an advertiser may specify a budget resulting in reduced revenue to the online system. Alternatively, providing a budget for advertisement presentation via the online system advertisers may deter an advertiser from providing advertisements to the online system. Additionally, new advertisers may be discouraged from additional advertisement via the online system if an advertising campaign does not result in a desired number of impressions or conversion events. Hence, advertisers specifying budgets for advertising via an online system without contextual information may specify budgets that reduce revenue to the online system or may be discouraged from advertising via the online system.

SUMMARY

To increase likelihood that an advertiser will compensate an online system for presenting advertisements and/or to increase revenue earned by the online system for presenting advertisements, the online system presents an advertiser with a range of candidate budgets for an advertisement or for an advertising campaign. Each candidate budget specifies an amount of compensation for the online system. In some embodiments, a candidate budget also specifies an estimated number of conversion events associated with the amount of compensation. The advertiser may select one of the candidate budgets for an advertisement or for an advertising campaign, and the online system uses the selected candidate budget when presenting advertisements associated with the advertiser or with an advertising campaign. For example, a candidate budget associates an estimated five to ten installations of an object being advertised with $10.00 of compensation to the online system.

In some embodiments, the online system recommends a range of budget options from the candidate budgets when presenting the candidate budgets to an advertiser. A default budget may also be identified from the range of candidate budgets and identified to the advertiser. For example, the online system pre-selects a default budget when presenting candidate budgets to an advertiser. The online system may identify the default budget as a candidate budget having a maximum likelihood that an advertiser elects to present advertisements via the online system or as a candidate budget resulting in a maximum predicted revenue to the online system. In some embodiments, the budget options are identified as candidate budgets associated with at least a threshold likelihood of being selected by the advertiser; for example, each candidate budget is associated with a likelihood of being selected, or "purchased," by the advertiser based on information associated with the advertiser, additional advertisers, the advertisement, and/or additional advertisements.

A range of candidate budgets and the default budget may be determined based on factors associated with the advertiser to which the budgets are presented. For example, if the advertiser has not previously provided compensation to the online system for presenting advertisements, the online system determines candidate budgets associated with at least a threshold likelihood that the advertiser will compensate the online system for presenting an advertisement. As another example, if an advertiser has previously presented advertisements via the online system, candidate budgets are determined to maximize revenue received by the online system. In various embodiments, the range of candidate budgets and the default budget are determined using a process that maximizes the likelihood that the advertiser will purchase an advertisement and/or that maximizes revenue to the online system. For example, candidate budgets and a default budget presented to a new advertiser (i.e., an advertiser that has not previously presented advertisements via the online system) are determined using a machine learned model trained using historical data about budgets specified or selected by new advertisers that purchased advertisements on the online system. As an additional example, candidate budgets and a default budget presented to a returning advertiser are determined using a machine learned model trained using historical data about revenue earned by the online system from advertisements having various budgets specified by additional returning advertisers.

Additional information associated with an advertisement may also be used to determine candidate budgets and/or a default budget for an advertisement. In one embodiment, characteristics of an object associated with an advertisement are used to determine the candidate budgets and/or the default budget. For example, if the object being advertised is a page on a social networking system, the candidate budgets and default budget are based in part on an estimated number of online system users indicating a preference for the page after being presented with the advertisement. Similarly, if the object being advertised is an application, the candidate budgets may be based on an estimated number of online system users to install the application after being presented with the advertisement. Targeting criteria associated with an advertisement may also be identified and the candidate budgets and/or default budget determined based in part on the targeting criteria. For example, candidate budgets, or a default budget for an advertisement associated with targeting criteria satisfied by less than a threshold number of online system users are less than candidate budgets, or default budget, for an advertisement associated with targeting criteria satisfied by at least the threshold number of online system users because of the increased opportunities for presenting an advertisement associated with targeting criteria satisfied by at least the threshold number of online system users.

BRIEF DESCRIPTION OF THE DRAWINGS

FIGS. 4A and 4B are examples of user interfaces for recommending budgets to an advertiser for presenting one or more advertisements via an online system, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
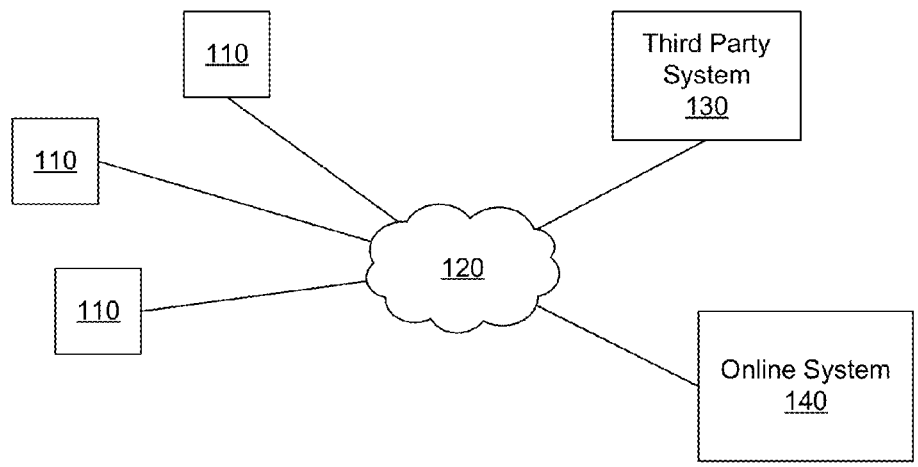
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. In some embodiments, the online system 140 is a social networking system.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™. In some embodiments, the user of the client device 110 may be an advertiser.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
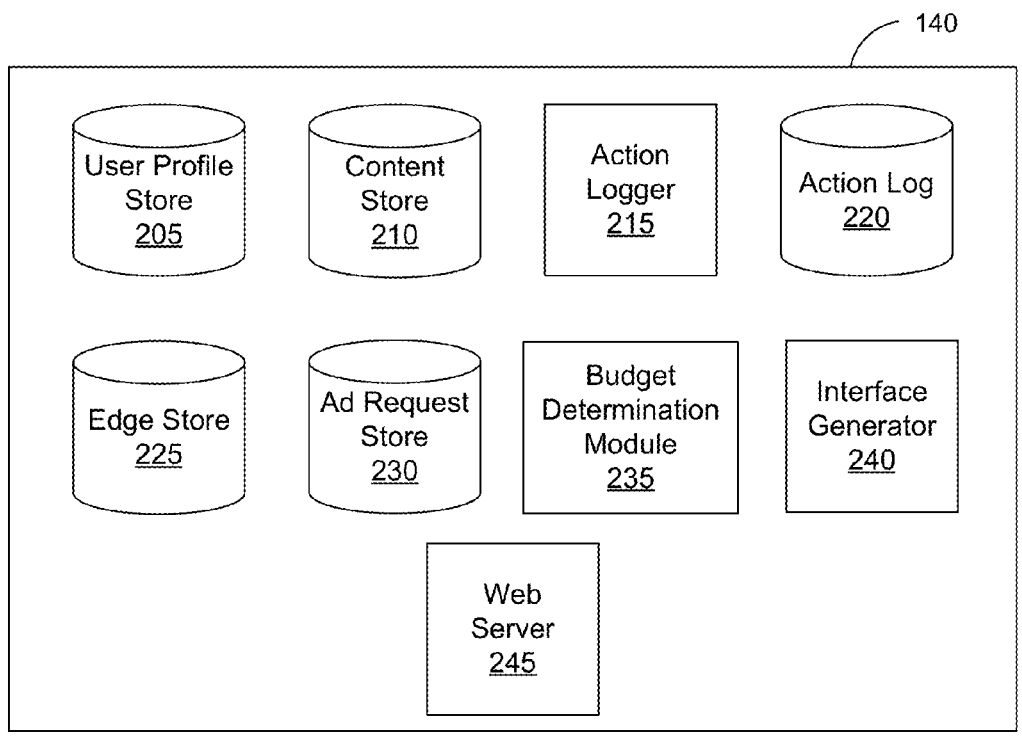
FIG. 2 is a block diagram of an online system, in accordance with an embodiment.

FIG. 2 is a block diagram of an architecture of the online system 140, which may be a social networking system in some embodiments. The online system 140 shown in FIG. 2 includes a user profile store 205, a content store 210, an action logger 215, an action log 220, an edge store 225, an ad request store 230, a budget determination module 235, an interface generator 240, and a web server 245. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the social networking system users displayed in an image. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other social networking system users. The entity may post information about itself, about its products or provide other information to users of the social networking system using a brand page associated with the entity's user profile (e.g., operate as an advertiser). Other users of the social networking system may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system, events, groups or applications. In some embodiments, objects are received from third-party applications or third-party applications separate from the online system 140. In one embodiment, objects in the content store 210 represent single pieces of content, or content "items." Hence, social networking system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of a online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or another user in the online system 140 based on the actions performed by the user. A user's affinity may be computed by the online system 140 over time to approximate a user's interest for an object, interest, or other user in the online system 140 based on the actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are stored in the ad request store 230. An advertisement request includes advertisement content and a bid amount. The advertisement content is text data, image data, audio data, video data, or any other data suitable for presentation to a user. In various embodiments, the advertisement content also includes a network address specifying a landing page to which a user is directed when the advertisement is accessed.

The bid amount is associated with an advertisement by an advertiser and specifies an amount of compensation the advertiser provides the online system 140 if the advertisement is presented to a user or accessed by a user. In one embodiment, the bid amount is used by the online system to determine an expected value, such as monetary compensation, received by the online system 140 for presenting the advertisement to a user, if the advertisement receives a user interaction, or based on any other suitable condition. For example, the bid amount specifies a monetary amount that the online system 140 receives from the advertiser if the advertisement is displayed and the expected value is determined based on the bid amount and a probability of a user accessing the displayed advertisement.

Additionally, an advertisement request may include one or more targeting criteria specified by the advertiser. Targeting criteria included in an advertisement request specify one or more characteristics of users eligible to be presented with advertisement content in the advertisement request. For example, targeting criteria are used to identify users having user profile information, edges or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the online system 140. The targeting criteria may also specify interactions between a user and objects performed external to the online system 140, such as on a third party system 130. For example, targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in targeting criteria allows advertisers to further refine users eligible to be presented with content from an advertisement request. As another example, targeting criteria identifies users having a connection to another user or object or having a particular type of connection to another user or object.

An ad request may include additional information associated with an advertisement or advertiser. For example, an ad request includes information about an advertiser. Examples of information associated with the advertiser include information describing whether the advertiser has previously presented advertisements via the online system 140, a number of advertisements associated with the advertiser that have previously been presented by the online system 140, and an amount of revenue earned by the online system 140 from presenting advertisements associated with the advertiser. An ad request may include information describing presentation of an advertisement based on the ad request. For example, an ad request is associated with information describing a historical conversion rate of an associated advertisement, historical revenue earned by the online system 140 from each conversion, a number of times the advertisement has been presented, or other suitable information.

The budget determination module 235 retrieves information associated with an advertiser, an advertisement, an object being advertised, and other contextual information. Examples of retrieved information associated with an advertiser include an amount of interaction with the online system 140 by the advertiser (e.g., the number of times the advertiser logs into the online system 140, posts content on the online system 140, etc.), an amount of time the online system 140 has maintained a user profile for the advertiser, the advertiser's geographic location, and conversion rates of previous advertisements associated with the advertiser or advertisements with similar characteristics previously presented by the online system 140. Retrieved information associated with an advertisement includes a type associated with a budget for the advertisement (i.e., a lifetime budget or daily budget) and targeting criteria associated with the advertisement. An example of retrieved information associated with the object being advertised is a popularity of the object being advertised (e.g., a number of online system users expressing a preference for a page, a number of online system users installing an application, etc.).

Information retrieved by the budget determination module 235 may be retrieved from the ad request store 230. For example, if the budget determination module 235 determines that an advertiser has previously presented advertisements via the online system 140, the budget determination module 235 retrieves information describing the advertiser's previous advertisement-related spending patterns and other information associated with previous advertising campaigns (e.g., bid amounts, historical conversion rates, historical revenue earned by the online system 140 from each conversion, targeting criteria, and budgets). As an additional example, if an advertiser has not previously presented advertisements via the online system 140, the retrieved information may include previous advertisement-related spending patterns of advertisers with similar characteristics to the advertiser (e.g., geographic location, type of business, etc.) and/or information associated with similar previous advertising campaigns or advertisements (e.g., advertisements associated with a similar object, advertisements having similar targeting criteria).

Using the retrieved information, the budget determination module 235 determines candidate budgets based on a process that maximizes a likelihood that the advertiser will present advertisements via the online system 140 in exchange for compensation to the online system 140 or that maximizes revenue received by the online system 140 for presentation of advertisements. A machine learned model or other suitable method may be used to determine candidate budgets based on information associated with the advertiser, information associated with the advertisement, and/or information associated with an object associated with the advertisement. In one embodiment, to determine candidate budgets, the online system 140 presents sample budgets to various advertisers and identifies actions taken by the advertisers. For example, after presenting sample budgets to an advertiser, the online system 140 determines whether the advertiser elected to have the online system 140 present one or more advertisements, the budget selected by the advertiser, a time interval during which the advertisement was displayed, revenue received by the online system 140, etc. Based on the sample budgets previously selected by advertisers, information associated with the advertiser, information associated with the advertisement, and/or information associated with an object associated with the advertisement the budget determination module 235 determines candidate budgets.

Alternatively, actions taken by an advertiser regarding an advertisement are associated with an ad request corresponding to the advertisement or otherwise associated with the advertiser. For example, the online system 140 associates information about whether an advertiser has previously presented advertisements via the online system 140 with a user profile associated with the advertiser and information about the type of object being advertised with an ad request describing an advertisement for the object. The budget determination module 235 may retrieved information describing advertisers' actions to train one or more machine learned models for determining a range of candidate budgets having at least a threshold likelihood that an advertiser will compensate the online system 140 for presenting advertisements or resulting in at least a threshold amount of revenue to the online system 140 for presenting advertisements. In some embodiments, the budget determination module 235 determines a minimum budget and a maximum budget for an advertisement and identifies candidate budgets within the minimum budget and the maximum budgets.

The budget recommendation module 235 estimates a number of conversion events associated with each candidate budget based on historical conversion data, or other suitable data. For example, an estimated number of conversion events for a cost-per-click advertisement for a department store is based on a historical number of clicks on cost-per-click advertisements for department stores that were previously presented for the same duration as the advertisement or were previously presented to online system users satisfying a threshold number of targeting criteria matching targeting criteria associated with the advertisement. The estimated number of conversion events may be expressed as a range of conversion events. For example, a budget of $5.00 per day may be associated with an estimate of one to five conversions per day.

From the candidate budgets, the budget recommendation module 235 selects a default budget. In one embodiment, the default budget is a candidate budget associated with a maximum likelihood that an advertiser will elect to present advertisements via the online system 140 or is the candidate budget resulting in a maximum amount of revenue received by the online system 140 for presenting one or more advertisements. The budget recommendation module 235 may select the default budget using a specified function, a machine learned model, or any other suitable method.

The interface generator 240 generates one or more interfaces identifying candidate budgets to an advertiser and allowing the advertiser to select a candidate budget to associate with an advertisement or an advertising campaign. For example, the interface generator 240 creates interfaces identifying candidate budgets, estimated numbers of conversion events associated with candidate budgets, and/or a default budget to an advertiser. The interfaces generated by the interface generator 230 may also include additional options for selection by the advertiser. For example, an interface generated by the interface generator 240 includes various options that when selected by the advertiser, allow the advertiser to provide information to the online system 140 or to view additional information. Example options presented in an interface include an option for an advertiser to specify a budget not included in the candidate budgets and an option for the advertiser to view additional candidate budgets. The interface generator 240 is further described below in conjunction with FIGS. 4A and 4B.

The web server 245 links the online system 140 via the network 120 to the one or more client devices 110, as well as to the one or more third party systems 130. The web server 245 serves web pages, as well as other content, such as JAVA®, FLASH®, XML and so forth. The web server 245 may receive and route messages between the online system 140 and the client device 110, for example, instant messages, queued messages (e.g., email), text messages, short message service (SMS) messages, or messages sent using any other suitable messaging technique. A user may send a request to the web server 245 to upload information (e.g., images or videos) that is stored in the content store 210. Additionally, the web server 245 may provide application programming interface (API) functionality to send data directly to native client device operating systems, such as IOS®, ANDROID™, WEBOS® or BlackberryOS.

Recommending Budgets to an Advertiser

Figure 3:
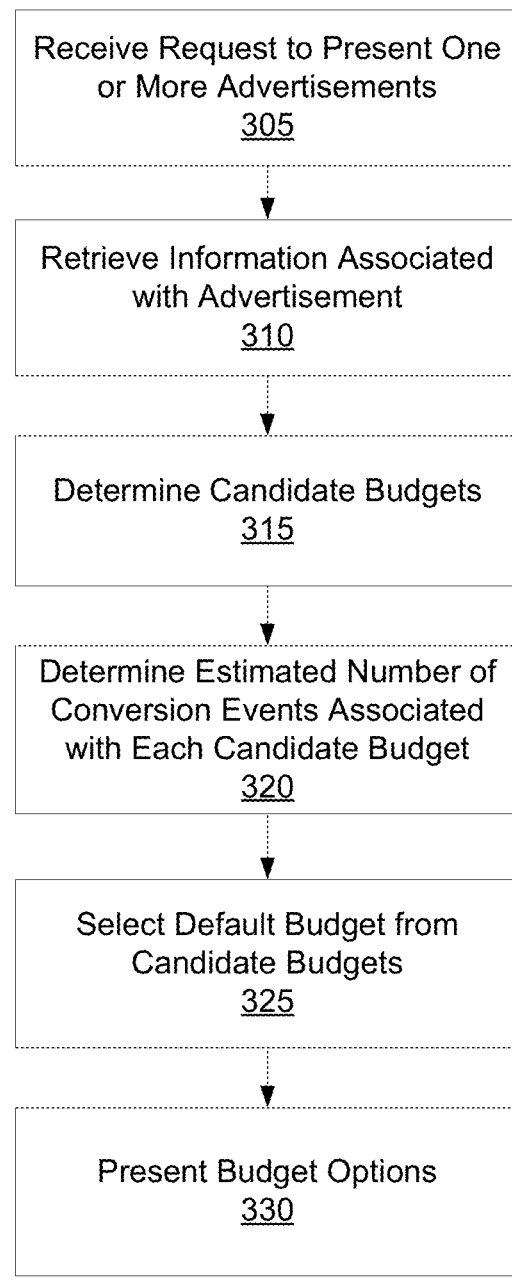
FIG. 3 is a flowchart of a method for recommending a budget to an advertiser for presentation of one or more advertisements via an online system, in accordance with an embodiment.

FIG. 3 is a flow chart of a method for recommending a budget to an advertiser for presentation of one or more advertisements via an online system 140. In the example of FIG. 3, the online system 140 receives 305 a request from an advertiser to present one or more advertisement to one or more users of the online system 140. The request may identify an advertisement or an advertising campaign including multiple advertisements for presentation to online system users. For example, the request identifies advertisement content for presentation, targeting criteria associated with the advertisement creative, a duration during which the advertisement is presented, or other suitable information.

The online system 140 retrieves 310 information associated with the one or more advertisements or with advertising campaign identified by the request. The retrieved information may identify information associated with the advertiser from which the one or more advertisements were received, may describe an object being advertised by the advertisement, or may be other contextual information. Examples of retrieved information associated with the advertisement include the popularity of the object being advertised (e.g., a number of users who installed an application, expressed a preference for a page, purchased a product or service), a type of budget selected by the advertiser (i.e., a lifetime budget or a daily budget), the advertiser's interaction with the online system 140 (e.g., a frequency with which the advertiser logs onto the online system 140, a frequency with which the advertiser posts information on the online system 140, etc.), the advertiser's geographic location, targeting criteria associated with the advertisement, and the amount of time the advertiser has interacted with the online system 140 (i.e., an amount of time elapsed since the advertiser generated a user profile maintained by the online system 140). Additional examples of the retrieved information include information obtained from third party systems 130 (e.g., credit information associated with the advertiser, user reviews about the advertiser or object being advertised, a number of advertisers competing with the advertisers, information identifying advertisers competing with the advertisers, etc.), historical conversion rates associated with previous advertisements purchased by the advertiser, historical conversion rates associated with advertisements previously presented by the online system 140 and having similar characteristics to the one or more advertisements identified by the request, and historical amounts spent by the advertiser from which the request was received 305 for presenting advertisements through the online system 140.

Based at least in part on the retrieved information, the online system 140 determines 315 candidate budgets for presentation of the one or more advertisements. In one embodiment, the online system 140 determines 315 the candidate budgets using a process that optimizes a likelihood that an advertiser that has not previously presented advertisements via the online system 140 will compensate the online system 140 for presenting advertisements or that maximizes revenue earned by the online system 140 from presenting advertisements via the online system 140. For example, the candidate budgets are determined 315 using a specified function, a machine learned model, or based on any other suitable method. For a daily budget, the estimated revenue to the online system 140 is determined based on the daily budget and a time interval during which the advertisement or advertisements associated with the daily budget have at least a threshold likelihood of being presented. For example, the estimated revenue is a product of the daily budget and a number of days during which the advertisement has a threshold likelihood of being presented.

In one embodiment, a minimum budget and a maximum budget for an advertiser are determined 315 based on information associated with the advertiser and/or with similar advertisers, and candidate budgets are determined based on the minimum budget and the maximum budget. For example, a minimum budget of $5.00 per day and a maximum budget of $25.00 per day are determined to have a maximum likelihood that the online system 140 receives a maximum amount of revenue for presenting the one or more advertisements. The maximum budget and minimum budget are identified as candidate budgets, as well as additional candidate budgets within a range bounded by the maximum budget and the minimum budget (e.g., $10.00, $15.00, and $20.00 per day).

Alternatively, the online system 140 trains one or more machine learned models to determine 315 a plurality of candidate budgets based on data obtained from sample budgets previously selected by advertisers. For example, the obtained data indicates whether an advertiser selected a sample budget, a sample budget selected, a duration during which one or more advertisements associated with the selected sample budget were presented, the revenue earned by the online system 140 from presenting one or more advertisements associated with a sample budget, or other suitable information. For example, if interactions associated with an advertiser indicate the advertiser has not previously compensated the online system 140 for presenting advertisements, one or more machine learned models generate candidate budgets associated with a threshold likelihood that the advertiser will elect to present advertisements via the online system 140 based on prior selections of sample budgets by advertisers with similar characteristics to the advertiser. As another example, if interactions associated with an advertiser indicate the advertiser has previously compensated the online system 140 for presenting advertisements, the one or more machine learned models generate candidate budgets associated with at least a threshold revenue generated by the online system 140 for presenting advertisements based on prior selections of sample budgets by the advertiser (e.g., budgets previously specified by the advertiser) or by advertisers having similar characteristics to the advertiser. As described above in conjunction with FIG. 2, the online system 140 may store data describing an advertiser's interactions in a user profile of the advertiser or association with data describing an advertisement or an advertising campaign.

The online system 140 also determines a likelihood of the advertiser electing to present the one or more advertisements via the online system 140 associated with each of the candidate options (i.e., a likelihood of the advertiser completing a "purchase" of one or more advertisements at each of the of candidate budgets) based at least in part on the retrieved information. As described above, sample budgets selected by advertisers, prior budgets selected by the advertiser, or other retrieved information associated with the advertiser, associated with additional advertisements, or associated with additional advertisers may be used to determine the likelihood of the advertiser completing a purchase using a candidate budget. For example, a percentage of advertisers with attributes similar to the advertiser presented with a sample budget that selected the sample budget is used to determine the likelihood of the advertiser purchasing presentation of one or more advertisements using a candidate budget corresponding to the sample budget.

In some embodiments, the online system 140 also determines 320 an estimated number of conversion events associated with each candidate budget based on historical conversion data for advertisements with similar attributes to the one or more advertisements identified by the request to present one or more advertisements. For example, an estimated number of installations of an advertised application is based on a prior number of installations of an application having at least a threshold number of characteristics matching, or similar to, the advertised application. The estimated number of conversion events may be expressed as a range of conversions per time interval. For example, a budget of $20.00 per day may be associated with an estimate of twenty to thirty conversion events per day.

A default budget may be selected 325 from the candidate budgets. The default budget is a candidate budget associated with a maximum likelihood that an advertiser will compensate the online system 140 for presenting advertisements or is a candidate budget associated with a maximum revenue generated by the online system 140 for presenting advertisements. One or more machine learned models or any other suitable method may be used to select 325 the default budget based on budgets previously specified by the advertiser or specified by advertisers with characteristics similar to the advertiser and/or revenue received by the online system 140 for presenting advertisements associated with the advertiser or received by the online system for presenting advertisements associated with advertisers having characteristics similar to the advertiser.

One or more budget options are selected from the plurality of candidate budgets and presented 330 to the advertiser in an advertisement purchase interface based on the likelihood of the advertiser purchasing presentation of one or more advertisements from the candidate budgets. In one embodiment, the candidate budgets are ranked based on their associated likelihoods of the advertiser purchasing presentation of one or more advertisements, and budget options are selected as candidate budgets having at least a threshold position in the ranking. Alternatively, candidate budgets associated with at least a threshold likelihood of the advertiser purchasing presentation of the one or more advertisements or having maximum likelihoods of the advertiser purchasing presentation of the one or more advertisements are selected as budget options. For example, the online system 140 generates an interface identifying candidate budgets and the default budget for presentation by a client device 110. As another example, the interface presents 330 the candidate budgets or a set of the candidate budget.

FIGS. 4A and 4B are examples of interfaces for recommending budgets to an advertiser for presenting one or more advertisements via the online system 140. Different interfaces may be generated for different types of budgets. FIG. 4A shows an example interface presenting candidate daily budget options, while FIG. 4B shows an example interface presenting candidate lifetime budget options. As shown in FIGS. 4A and 4B, a user interface may indicate indication of the type of budget (i.e., daily or lifetime) and include a selectable menu of budget options including the default budget. Each budget options includes a budget amount and may also include an estimated number of conversions associated with the budget amount. In FIG. 4A, a default budget 400 is visually distinguished from other budget options; similarly, FIG. 4B visually distinguishes the default budget 420 from other budget options. Visually distinguishing a default budged increases the likelihood of an advertiser selecting the default budget from the budget options. For example, a default budget is presented in a different font from other budget options, using a different color than other budget options, using a different size text than other budget options, or using any other suitable method to differentiate the default budget from other budget options. As another example, budget options may be presented 330 in a menu (e.g., a pull-down or scrollable menu) that identifies the pre-selected default budget (e.g., with a check mark, highlight, larger font, etc.). Candidate budgets and the default budget for an advertisement or advertising campaign may be stored in a user profile associated with the advertiser or may be stored in association with data describing the advertisement or advertising campaign.

In some embodiments, an interface includes an interface element 410 allowing an advertiser to receive additional information or to specify a budget differing from the presented budget options. For example, selecting the interface element 410 allows the advertiser to specifies a new budget not included in the budget options to the online system 140. As another example, advertiser interaction with the interface element 410 prompts the online system 140 to provide additional budget options for presentation to the advertiser. For example, the advertiser selects an option to increase the number of budget options presented, selects an option to modify the amounts of the budget options, selects an option to modify an estimated number of conversion events, or selects any suitable option associated with one or more presented interface elements 410.

SUMMARY

The foregoing description of embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of embodiments is intended to be illustrative, but not limiting, of the scope of the patent rights, which is set forth in the following claims.

What is claimed is:

1. A method comprising:

receiving, at an online system, a request from an advertiser of the online system identifying an advertisement for presentation to one or more users of the online system;

retrieving, by the online system, information associated with the advertisement;

determining, by the online system, a plurality of candidate budgets for the advertisement based at least in part on the retrieved information associated with the advertisement, each candidate budget specifying an amount of compensation to be provided to the online system for presenting the advertisement;

for each candidate budget, determining, by the online system, a likelihood of a purchase of the advertisement at the candidate budget based at least in part on the retrieved information associated with the advertisement, the likelihood being a numerical value quantifying a probability of the advertiser selecting the advertisement;

determining, by the online system, an ad purchase interface comprising a set of budget options selected from the plurality of candidate budgets based at least in part on the determined likelihoods of the purchase of the advertisement at the corresponding candidate budgets; and providing, by the online system, the ad purchase interface to a client device for display to the advertiser.

2. The method of claim 1, further comprising:

identifying a default budget from the set of budget options, the default budget comprising a candidate budget associated with a maximum likelihood of the purchase of the advertisement;

wherein the ad purchase interface is configured such that, when displayed, the default budget is visually distinguished from other budget options.

3. The method of claim 1, wherein retrieving, by the online system, information associated with the advertisement comprises:

retrieving information associated with the advertiser by the online system; and retrieving information describing the advertisement.

4. The method of claim 3, wherein the information associated with the advertiser by the online system is selected from a group consisting of: an amount of interaction with the online system by the advertiser, an amount of time the online system has maintained a user profile associated with the advertiser, a geographic location associated with the advertiser, a rate of conversion events associated with additional advertisements associated with the advertiser, one or more amounts of revenue received by the online system from the advertiser for presentation of additional advertisements associated with the advertiser, and any combination thereof.

5. The method of claim 3, wherein the information associated with the advertiser by the online system is selected from a group consisting of: credit information associated with the advertiser, one or more reviews of the advertiser, information describing one or more additional advertisers of the online system, and any combination thereof.

6. The method of claim 3, wherein the information describing the advertisement is selected from a group consisting of: a measure of popularity of an object associated with the advertisement among users of the online system, a time interval during which the advertisement will be presented to one or more users, targeting criteria associated with the advertisement, and any combination thereof.

7. The method of claim 1, wherein determining, by the online system, the plurality of candidate budgets for the advertisement comprises:

retrieving one or more budgets previously specified by one or more additional advertisers for presentation of one or more additional advertisements to users of the online system;

determining an amount of revenue received by the online system from presenting additional advertisements associated with one or more of the retrieved budgets; and determining candidate budgets as budget amounts associated with at least a threshold amount of revenue based at least in part on the determined amount of revenue.

8. The method of claim 7, wherein the one or more additional advertisers includes the advertiser.

9. The method of claim 1, wherein determining, by the online system, the plurality of candidate budgets for the advertisement comprises:

retrieving one or more budgets previously specified by one or more additional advertisers for presentation of one or more additional advertisements to users of the online system;

determining a likelihood of the online system receiving compensation from the one or more additional advertisers based on the retrieved one or more budgets and actions associated with the one or more additional users; and determining candidate budgets as budget amounts associated with at least a threshold likelihood of the online system receiving compensation.

10. The method of claim 1, wherein determining the ad purchase interface comprising the set of budget options comprises:

determining an estimated number of conversion events associated with each budget option based at least in part on the retrieved information associated with the advertisement.

11. The method of claim 10, wherein determining the ad purchase interface comprising the set of budget options further comprises:

including information describing the estimated number of conversion events associated with each budget options in the ad purchase interface.

12. The method of claim 10, wherein the estimated number of conversion events associated with each candidate budget is based on one or more selected from a group consisting of: a historical number of conversion events associated with the advertiser, a historical rate of conversion events associated with the advertiser, a historical number of conversion events associated with the advertisement, a historical rate of conversion events associated with the advertisement, a historical rate of conversion events associated with an object associated with the advertisement, a historical number of conversion events associated with the object associated with the advertisement, and any combination thereof.

13. A computer program product comprising a non-transitory computer-readable storage medium having instructions encoded thereon that, when executed by a processor, cause the processor to:

receive, at an online system, a request from an advertiser of the online system identifying an advertisement for presentation to one or more users of the online system;

retrieve, by the online system, information associated with the advertisement;

determine, by the online system, a plurality of candidate budgets for the advertisement based at least in part on the retrieved information associated with the advertisement, each candidate budget specifying an amount of compensation provided to the online system for presenting the advertisement;

for each candidate budget, determine, by the online system, a likelihood of a purchase of the advertisement at the candidate budget based at least in part on the retrieved information associated with the advertisement, the likelihood being a numerical value quantifying a probability of the advertiser selecting the advertisement;

determine an ad purchase interface comprising a set of budget options selected from the plurality of candidate budgets based at least in part on the determined likelihoods of the purchase of the advertisement at the corresponding candidate budgets; and provide, by the online system, the ad purchase interface to a client device for display to the advertiser.

14. The computer program product of claim 13, wherein the instructions are further configured to cause the processor to:

identify a default budget from the set of budget options, the default budget comprising a candidate budget associated with a maximum likelihood of the purchase of the advertisement; and wherein the ad purchase interface is configured such that, when displayed, the default budget is visually distinguished from other budget options.

15. The computer program product of claim 13, wherein retrieve, by the online system, information associated with the advertisement comprises:

retrieve information associated with the user by the online system; and retrieve information describing the advertisement.

16. The computer program product of claim 15, wherein the information associated with the advertiser by the online system is selected from a group consisting of: an amount of interaction with the online system by the advertiser, an amount of time the online system has maintained a user profile associated with the advertiser, a geographic location associated with the advertiser, a rate of conversion events associated with additional advertisements associated with the advertiser, one or more amounts of revenue received by the online system from the user for presentation of additional advertisements associated with the advertiser, and any combination thereof.

17. The computer program product of claim 15, wherein the information associated with the advertiser by the online system is selected from a group consisting of: credit information associated with the advertiser, one or more reviews of the advertiser, information describing one or more additional advertiser of the online system, and any combination thereof.

18. The computer program product of claim 15, wherein the information describing the advertisement is selected from a group consisting of: a measure of popularity of an object associated with the advertisement among users of the online system, a time interval during which the advertisement will be presented to the one or more users, targeting criteria associated with the advertisement, and any combination thereof.

19. The computer program product of claim 13, wherein determine, by the online system, the plurality of candidate budgets for the advertisement comprises:

retrieve one or more budgets previously specified by one or more additional advertisers for presentation of one or more additional advertisements to users of the online system;

determine an amount of revenue received by the online system from presenting additional advertisements associated with one or more of the retrieved budgets; and determine candidate budgets as budget amounts associated with at least a threshold amount of revenue based at least in part on the determined amount of revenue.

20. The computer program product of claim 13, wherein determine the ad purchase interface comprising the set of budget options comprises:

determine an estimated number of conversion events associated with each budget option based at least in part on the retrieved information associated with the advertisement; and include information describing the estimated number of conversion events associated with each budget options in the ad purchase interface.

21. A system comprising:

a processor; and a computer-readable storage medium coupled to the processor, the computer-readable storage medium having instructions encoded thereon that, when executed by the processor, cause the processor to:

receive, at an online system, a request from an advertiser of the online system identifying an advertisement for presentation to one or more users of the online system;

retrieve, by the online system, information associated with the advertisement;

determine, by the online system, a plurality of candidate budgets for the advertisement based at least in part on the retrieved information associated with the advertisement, each candidate budget specifying an amount of compensation provided to the online system for presenting the advertisement;

for each candidate budget, determine, by the online system, a likelihood of a purchase of the advertisement at the candidate budget based at least in part on the retrieved information associated with the advertisement, the likelihood being a numerical value quantifying a probability of the advertiser selecting the advertisement;

determine an ad purchase interface comprising a set of budget options selected from the plurality of candidate budgets based at least in part on the determined likelihoods of the purchase of the advertisement at the corresponding candidate budgets; and provide, by the online system, the ad purchase interface to the client device for display to the advertiser.

22. The method of claim 1, further comprising:

receiving, at the online system, a budget selection from the set of budget options; and presenting, by the online system, the advertisement to audience users according to the budget selection.

* * * * *

UNITED STATES PATENT AND TRADEMARK OFFICE
CERTIFICATE OF CORRECTION

PATENT NO. : 9,754,283 B2
APPLICATION NO. : 14/169513
DATED : September 5, 2017
INVENTOR(S) : Dong Guo et al.

Page 1 of 1

It is certified that error appears in the above-identified patent and that said Letters Patent is hereby corrected as shown below:

On the Title Page

Abstract, Item (57), after "system," delete "provides".

Signed and Sealed this
First Day of May, 2018

Andrei Iancu
*Director of the United States Patent and Trademark Office*